(12) United States Patent
Parthasarathy

(10) Patent No.: US 9,273,969 B2
(45) Date of Patent: Mar. 1, 2016

(54) SYSTEM AND METHOD FOR PROVIDING ENHANCED FLIGHT-PLAN MANAGEMENT

(71) Applicant: HONEYWELL INTERNATIONAL INC., Morristown, NJ (US)

(72) Inventor: Sudarshan Parthasarathy, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/216,200

(22) Filed: Mar. 17, 2014

(65) Prior Publication Data

US 2015/0260525 A1    Sep. 17, 2015

(51) Int. Cl.
G01C 21/00 (2006.01)
G01C 21/20 (2006.01)
G08G 5/00 (2006.01)
G01C 23/00 (2006.01)

(52) U.S. Cl.
CPC ........... *G01C 21/20* (2013.01); *G01C 23/00* (2013.01); *G08G 5/0021* (2013.01); *G08G 5/0039* (2013.01)

(58) Field of Classification Search
CPC ...... B64C 19/00; G08G 5/0034; G01C 21/20; G01C 21/3415; G01C 21/3446; G05B 2219/36418; G05B 2219/36425
USPC ........... 701/538, 2–3, 300–302, 14, 120, 467; 244/164, 75.1; 345/173, 179, 158
See application file for complete search history.

(56) References Cited

U.S. PATENT DOCUMENTS

| | | |
|---|---|---|
| 4,675,676 A | 6/1987 | Takanabe et al. |
| 5,340,061 A | 8/1994 | Vaquier et al. |
| 5,959,625 A | 9/1999 | Betrisey et al. |
| 5,978,715 A | 11/1999 | Briffe et al. |
| 5,995,901 A | 11/1999 | Owen et al. |
| 6,112,141 A | 8/2000 | Briffe et al. |
| 6,389,355 B1 | 5/2002 | Gibbs et al. |
| 6,438,469 B1 | 8/2002 | Dwyer et al. |
| 6,449,556 B1 * | 9/2002 | Pauly ............................ 701/467 |
| 6,522,958 B1 | 2/2003 | Dwyer et al. |
| 6,571,171 B1 | 5/2003 | Pauly |
| 6,633,810 B1 | 10/2003 | Qureshi et al. |
| 6,707,475 B1 | 3/2004 | Snyder |
| 7,421,319 B2 | 9/2008 | Stefani |

(Continued)

FOREIGN PATENT DOCUMENTS

EP    2136276 A1    12/2009
EP    2362183 A2    8/2011

(Continued)

OTHER PUBLICATIONS

USPTO Office Action for U.S. Appl. No. 13/531,786; Notification date Jul. 31, 2013.

(Continued)

*Primary Examiner* — Dalena Tran
(74) *Attorney, Agent, or Firm* — Ingrassia Fisher & Lorenz, P.C.

(57) ABSTRACT

A system and method for positioning a new waypoint in a flight plan displayed on an avionics display in the form of an interactive graphical image comprises generating symbology on the display graphically representative of the new waypoint on the flight plan, and dragging the new waypoint on the display to alter its position.

13 Claims, 20 Drawing Sheets

(56) References Cited

U.S. PATENT DOCUMENTS

| | | | |
|---|---|---|---|
| 8,073,578 B1 | 12/2011 | McCusker | |
| 8,209,122 B2 | 6/2012 | Nichols et al. | |
| 8,234,059 B2* | 7/2012 | Sugiyama et al. | 701/418 |
| 8,380,366 B1 | 2/2013 | Schulte et al. | |
| 8,880,245 B2* | 11/2014 | Leberquer et al. | 701/3 |
| 2003/0036827 A1 | 2/2003 | Murphy | |
| 2008/0021648 A1 | 1/2008 | Wilson | |
| 2008/0294335 A1 | 11/2008 | Bitar et al. | |
| 2009/0288036 A1 | 11/2009 | Osawa et al. | |
| 2010/0318573 A1 | 12/2010 | Yoshikoshi | |
| 2011/0320068 A1 | 12/2011 | Lee et al. | |
| 2013/0013133 A1 | 1/2013 | Walter | |
| 2014/0032105 A1 | 1/2014 | Matthews et al. | |
| 2014/0074323 A1 | 3/2014 | Cecile et al. | |

FOREIGN PATENT DOCUMENTS

| | | |
|---|---|---|
| EP | 2679959 A1 | 1/2014 |
| GB | 1206693 | 9/1970 |
| WO | 2010089805 A1 | 8/2010 |

OTHER PUBLICATIONS

Buying a GPS Navigation Device, TomTom GPS Devices; http://voices.yahoo.com/buying-gps-navigation-device-8200335.html.

Aerial Camera, CCNS5—new FMS from IGI; http://www.aerial-survey-base.com/blog/ccns5-new-fms-from-igi.

Are Touchscreens Here to Stay? Left Seat; Sport Aviation forum; macsblog.com/2012/01are-touchscreens-here-to-stay/. Posted on Jan. 25, 2012 by Mac.

ARINC Direct adds graphical route modification to flight planning capabilities; BlueSky Business Aviation News; www.blueskynews.aero/issue_147/arinc_adds_GRM_to_flight_planning_capabilities.htm. [Retrieved from Internet Dec. 16, 2013].

EP Examination Report for Application No. 13171568.2 dated Feb. 9, 2015.

EP Search Report for application No. 13171568.2 dated Apr. 28, 2014.

EP Exam Report for Application 13171568.2, dated May 28, 2014.

USPTO Office Action, Notification Date Nov. 13, 2014; U.S. Appl. No. 13/708,299.

USPTO Final Office Action, Notification Date May 8, 2015; U.S. Appl. No. 13/708,299.

EP Extended Search Report for Application No. 15157260.9 dated Aug. 26, 2015.

USPTO Interview Summary, Notification Date Jul. 15, 2015; U.S. Appl. No. 13/708,299.

EP Examination Report for Application No. 13171568.2-1557 dated Sep. 24, 2015.

* cited by examiner

SYSTEM AND METHOD FOR PROVIDING ENHANCED FLIGHT-PLAN MANAGEMENT

TECHNICAL FIELD

The present invention relates generally to vehicular display systems and, more particularly, to an avionics display system and method for providing enhanced flight-plan management utilizing direct graphical entry resulting in immediate and live display feedback.

BACKGROUND

A pilot is faced with two major tasks; i.e. (1) to accurately determine and remain constantly aware of the current aircraft status including direction, speed, altitude, location and the rates of change of each; and (2) to quickly and accurately control the aircraft to effectuate a change in these parameters to achieve a desired status of the aircraft including, for example, setting or altering the aircraft's flight-plan.

To this end, avionics display systems deployed aboard aircraft has been extensively engineered to visually convey a considerable amount of flight information in an intuitive and readily comprehendible manner. In conventional avionics display systems, much of the information visually expressed on a cockpit display, (e.g., a primary flight display, a navigation display, etc.) pertains to aircraft parameters (e.g., the heading, drift, roll, and pitch of the host aircraft), nearby geographical features (e.g., mountain peaks, runways, etc.), and current weather conditions (e.g. developing storm cells).

A further improvement occurred with the introduction of flight management systems, a type of specialized computer that includes a database of pre-stored navigation landmark, such as an airport, or may represent an imaginary intersection (a waypoint) in the sky. A pilot may enter a flight plan by selecting a sequential series of waypoints through which the aircraft will travel.

System integrators have built flight control systems that facilitate the use of avionics systems; e.g., the PRIMUS EPIC suite of integrated flight electronics such as flight management systems (FMS), autopilots, cockpit displays, flight controls, and the like, as well as interoperability with navigational instruments such as global positioning systems (GPS), inertial reference systems (IRS), and the like. In particular, the PRIMUS EPIC suite includes an integrated avionics display that includes cursor control, windowing of information, movable navigation maps, ground-based weather, real-time video, aircraft utility system display and control, and the like. The PRIMUS EPIC suite includes a "point-and-click" navigation capability referred to as "Graphical INAV." As part of the "point-and-click" functionality, pilots may click on a map location (e.g. waypoint) to obtain a menu of the tasks that may be executed with respect to that location. An interface for obtaining additional information is presented to the pilot, and the pilot enters information with a keyboard, mouse/cursor, keypad or the like.

In the existing INAV for an FMS, the selection of an operation on a task menu of the INAV causes a dialog box to be displayed (i.e. in most cases) relevant to the selected operation. The dialog box presents various parameters that may be modified and then executed. For example, to define a holding pattern around a waypoint, for example, a pilot simply clicks on the waypoint, selects "hold" from a menu of task options, and enters or modifies parameters such as hold radial, hold leg distance, and hold direction, as appropriate. It is also known to provide dialog boxes in response to pilot commands to enable task parameters to be input or modified. Certain dialog boxes include graphical functionality and incorporate human factors enhancements.

In certain operations, a preview may be presented reflecting any modifications of the parameters presented in the dialog box while modifying the parameters; however, the preview is presented within the dialog box and is not referenced to the actual flight plan being modified. Thus, the user will not be able to see what is under the dialog box (e.g. weather, terrain, traffic, ADS-B IN information, etc.) on and around the selected waypoint. In fact, the dialog box may cover-up as much as 25% of the INAV screen including the aircraft symbol indicating the current aircraft position and a majority of the displayed information.

Although such systems represent improvements in avionics technology, further enhancements to cockpit displays that are easier to use and create interfaces for common pilot tasks that are intuitive and easy to use may be desirable. More specifically, it would be desirable to provide further enhancements to cockpit displays that are easier to use and create interfaces for flight plan operations for creating and inserting waypoints and altitude constraints.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In accordance with the foregoing, there is provided a system and method for positioning a new waypoint in a flight plan displayed on an avionics display in the form of an interactive graphical image that comprises generating symbology on the display graphically representative of the new waypoint on the flight plan, and dragging the new waypoint on the display to alter its position.

There is also provided an avionics display system and method for deployment onboard an aircraft that receives navigation data indicative of a flight plan displayed on an avionics display in the form of an interactive graphical image, comprising dragging a first bearing line from the new waypoint to a first existing waypoint, dragging a second bearing line from the new waypoint to a second existing waypoint, and generating symbology on the display graphically representative of the new waypoint at an intersection of the first and second bearing lines.

An avionics display system, comprising an interactive display system responsive to dragging on a display screen and a processor coupled to the display system and configured to (a) generate symbology on the display graphically representative of a new waypoint on a flight plan, and (b) move the new waypoint on the display to alter its position in response to dragging on the display screen.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
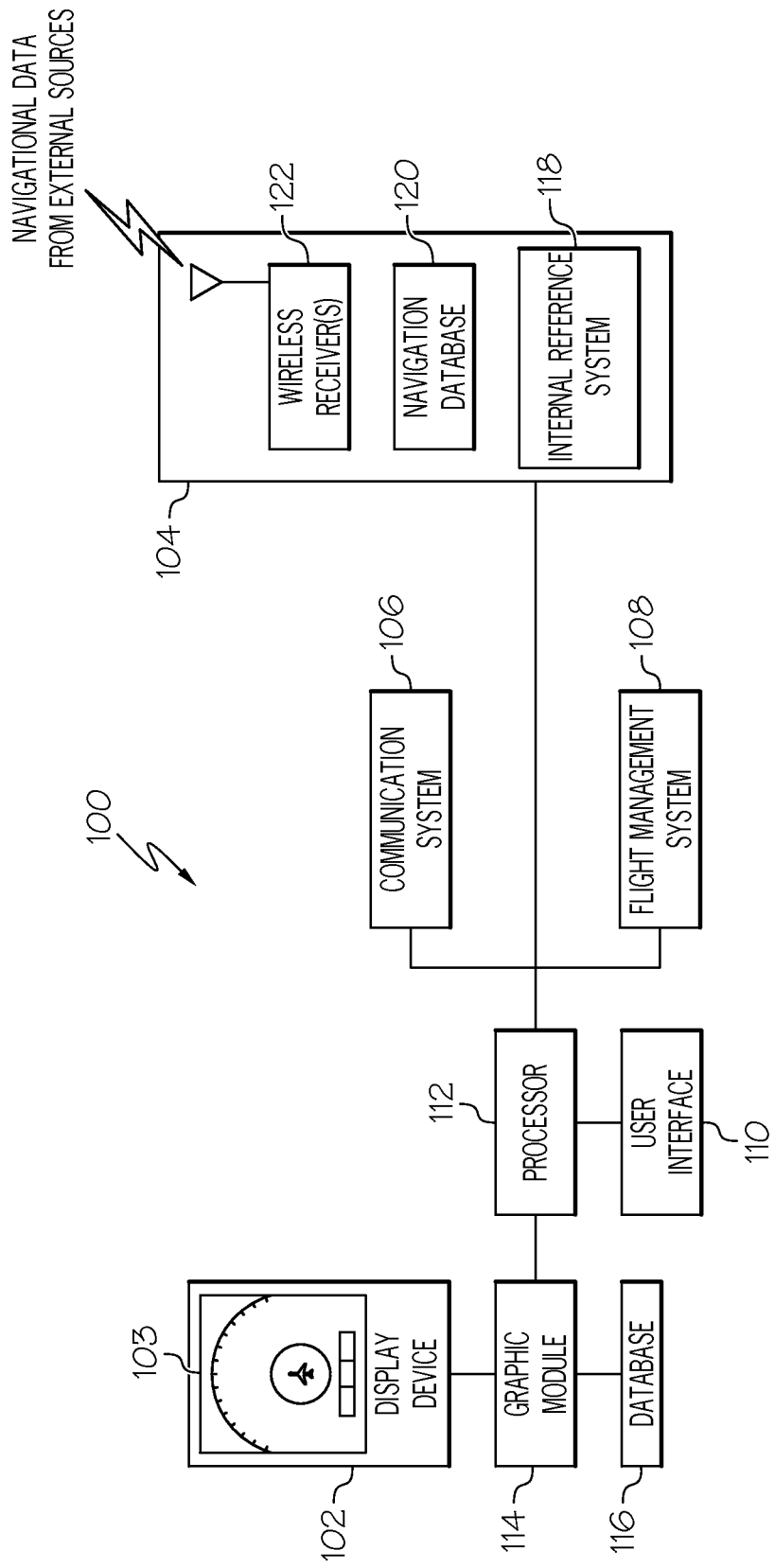
FIG. 1 is a block diagram of an information display system suitable for use in an aircraft in accordance with an embodiment.

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how a flight course may be graphically generated. For example, a graphical generation of waypoints and altitude constraints will be discussed. However, it should be appreciated that this explicated example embodiment is merely an example and a guide for implementing the novel display system and method. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to interactive display systems adapted for displaying, on a display device associated with an aircraft and adjusting the track (or path) defined by a flight plan (or travel route). A user can quickly and intuitively create a new waypoint or insert an altitude constraint on or into an existing flight plan. The overall workload on the user is reduced and the graphical adjustment is implemented in a manner that improves situational awareness. Although the subject matter is described herein in an aviation context, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to an aviation environment.

FIG. 1 depicts an exemplary embodiment of an interactive display system 100, which may be located onboard a vehicle such as an aircraft. In an exemplary embodiment, the display system 100 includes, without limitation, a display device 102 for displaying a graphical flight plan image 103, a navigation system 104, a communications system 106, a flight management system (FMS) 108, a processor 112, a graphics module 114, a user interface 110 (e.g. a cursor control device), and a database 116 suitably configured to support operation of the graphics module 114 and display device 102 (e.g. a touchscreen), as described in greater detail below. Navigation system 104 may include an inertial reference system 118, a navigation database 120 and one or more wireless receivers 122 for receiving navigational data from external sources in the well-known manner.

It should be understood that FIG. 1 is a simplified representation of an interactive display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the processor 112 for obtaining and/or providing real-time flight-related information that may be displayed on the display device 102.

In an exemplary embodiment, the display device 102 is coupled to the graphics module 114. The graphics module 114 is coupled to the processor 112, the display 102, and database 116 are cooperatively configured to display, render, or otherwise convey one or more graphical representations or images such as a flight plan associated with operation of the aircraft on the display device 102.

As stated previously, navigational system 104 includes an inertial reference system 118, a navigation database 120, and at least one wireless receiver 122. Inertial reference system 118 and wireless receiver 122 provide processor 112 with navigational information derived from sources onboard and external to the host aircraft, respectively. More specifically, inertial reference system 118 provides processor 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency Omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 stores a considerable amount of information useful in flight planning. For example, navigation database 120 can contain information pertaining to the geographical location of waypoints and lists of available approaches that may be flown by an aircraft when landing at a particular runway. During flight planning, a pilot may utilize user interface 110 to designate a desired approach from a list of available approaches stored in navigational database 120. After the pilot designates the desired approach, processor 112 may then recall from navigational database 120 relevant information pertaining to the designated approach.

Processor 112 is coupled to navigation system 104 for obtaining real-time navigational data and/or information regarding operation of the aircraft to support operation of the display system 100. In an exemplary embodiment, the communications system 106 is coupled to the processor 112 and configured to support communications to and/or from the aircraft, as is appreciated in the art. The processor 112 is also coupled to the flight management system 108, which in turn, may also be coupled to the navigation system 104 and the communications system 106 for providing real-time data and/or information regarding operation of the aircraft to the processor 112 to support operation of the aircraft. In an exemplary embodiment, the user interface 110 (e.g. touchscreen or cursor control) is coupled to the processor 112, and the user interface 110 and the processor 112 are cooperatively configured to allow a user to interact with display device 102 and other elements of display system 100, as described in greater detail below.

In an exemplary embodiment, the interactive display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to indicate, select, or otherwise manipulate content displayed on the display device 102, as described in greater detail below. In various embodiments, the user interface 110 may be realized as a keypad, touchpad, keyboard, cursor control, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

In an exemplary embodiment, the flight management system 108 maintains information pertaining to a current flight plan (or alternatively, a current route or travel plan). In this regard, depending on the embodiment, the current flight plan may comprise either a selected or otherwise designated flight plan for subsequent execution, a flight plan selected for review on the display device 102, and/or a flight plan currently being executed by the aircraft. In this regard, as used herein, a flight plan should be understood as a sequence of navigational reference points that define a flight path or route for the aircraft. In this regard, depending on the particular flight plan and type of air navigation, the navigational reference points may comprise navigational aids, such as VHF Omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final navigational reference point (e.g., an arrival or landing location), and one or more intermediate navigational reference points (e.g., waypoints, positional fixes, and the like) that define the desired path or route for the aircraft from the initial navigational reference point to the final navigational reference point. In this regard, the intermediate navigational reference points may define one or more airways for the aircraft en route to the final navigational reference point.

As described in greater detail below, the along track distance (or length) of the flight plan comprises the sum of all of the straight line ground distances between adjacent navigational reference points of the flight plan; i.e. the total ground distance corresponding to the route defined by the plurality of navigational reference points comprising the flight plan. For example, if the flight plan comprises three navigational reference points, the along track distance (or length) of the flight plan is equal to the sum of the straight line ground distance between a location corresponding to the first navigational reference point and a location corresponding to the second navigational reference point and the straight line ground distance between the location corresponding to the second navigational reference point and a location corresponding to the third navigational reference point.

In some embodiments, the flight management system 108 may include a database that maintains a plurality of predefined flight plans, wherein a predefined flight plan from the database may be selected by a user via user interface 110 for use as the current flight plan. In another embodiment, the current flight plan may be uplinked via the communications system 106. Alternatively, the user may utilize the user interface 110 to manually enter or indicate the desired endpoints (e.g., the initial and final navigational reference points) for the current flight plan. Depending on the embodiment, the user may manually enter the intermediate navigational reference points (e.g., via user interface 110), or alternatively, the intermediate navigational reference points may be automatically generated by the flight management system 108 based on the endpoints (e.g., the initial and final navigational reference points) of the flight plan, as will be appreciated in the art. As described in greater detail below, in an exemplary embodiment, the processor 112 and/or graphics module 114 are configured to display and/or render symbology pertaining to the generation (1) new waypoints on an existing flight plan, and (2) an altitude constraint on a vertical situation display device.

The processor 112 generally represents the hardware, software, and/or firmware components configured to facilitate the display and/or rendering of a navigational map on the display device 102 and perform additional tasks and/or functions described in greater detail below. Depending on the embodiment, the processor 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processor 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processor 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
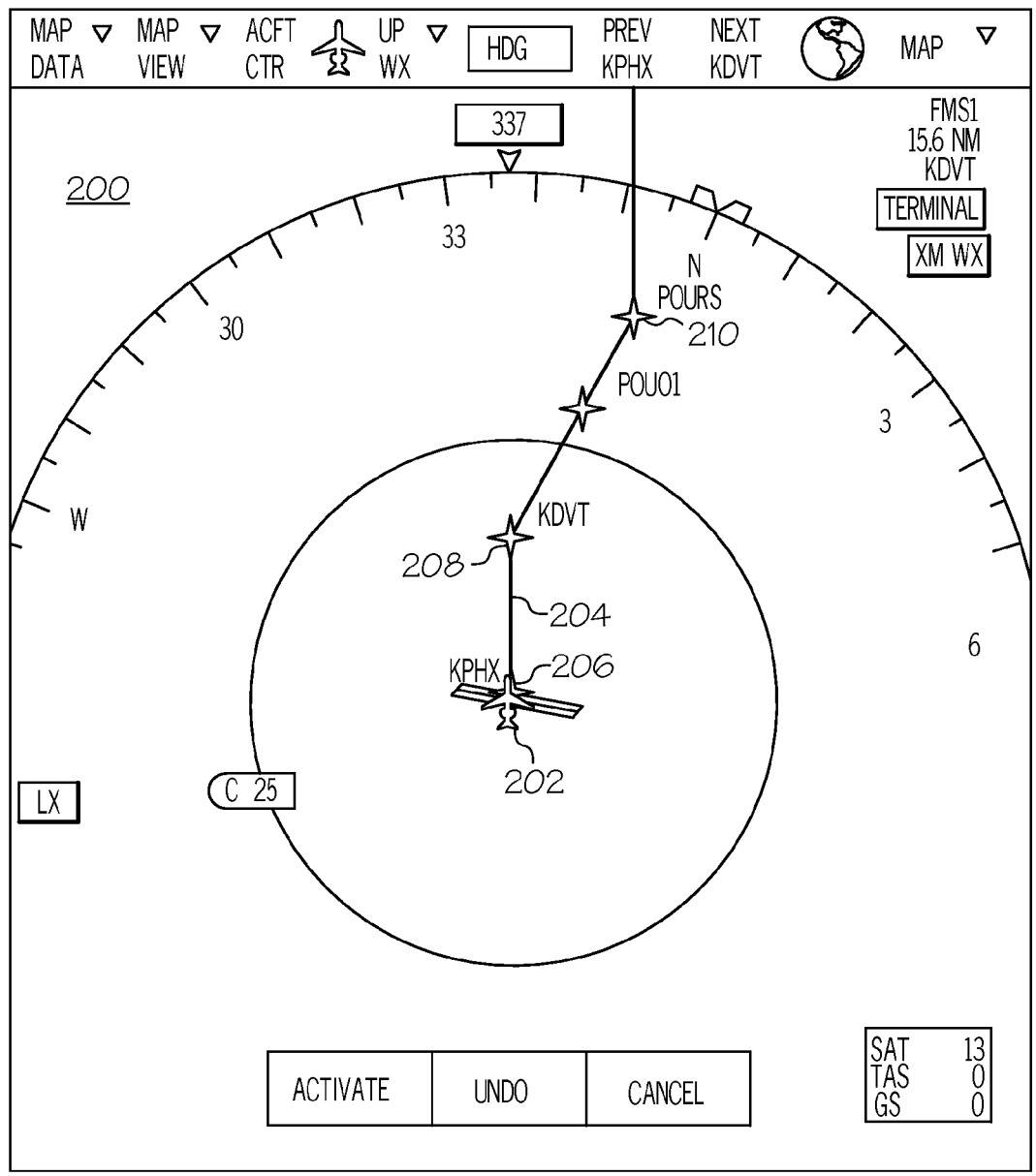
FIG. 2 is a graphical view of an exemplary navigational map suitable for use with the information display system of FIG. 1.

FIG. 2 is an exemplary display 200 of a graphical flight plan image that may be shown on display device 102 in display system 100 (FIG. 1). With reference to FIG. 2, display 200 suitably includes an aircraft indicator 202 on a flight plan indicator 204, which shows the path to be flown by the aircraft. The flight plan may be marked by a series of waypoints 206, 208 and 210 on FIG. 2. Each waypoint may correspond to a navigational aid, an airport, or any other point on a map. The flight plan shown in FIG. 2, for example, shows the aircraft flying from waypoint KPHX to waypoint KDVT, then turning toward waypoint POURS, and continuing on. A typical flight plan image may be represented as a series of flight segments from waypoint to waypoint, terminating at a destination airport. Changes to the flight plan may be made by adding, removing or adjusting waypoints. It is known to accomplish this with a flight management system (FMS) and/or through graphical manipulation of the waypoints on the display by the pilot.

Figure 3:
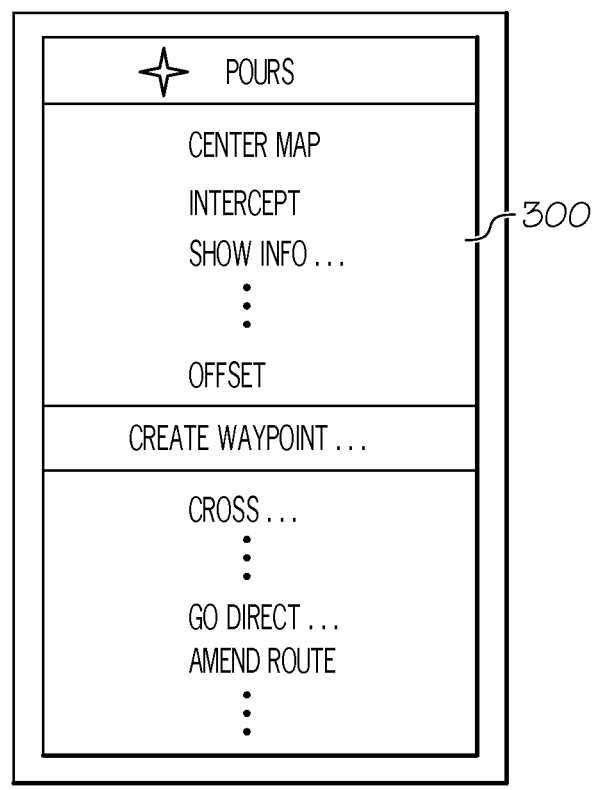
FIG. 3 illustrates an exemplary drop-down menu suitable for use in conjunction with the information display system of FIG. 1.

With reference now to FIG. 3, it is also known to provide pilots with further options by permitting a pilot to activate an options menu 300, which may be a pull-down window. The pilot may activate menu 300 by pointing to a reference waypoint with a cursor and, for example, clicking After the pilot activates the menu, a number of options are suitably presented to the pilot, who may choose an action associated with the particular waypoint. In the exemplary options menu 300 shown in FIG. 3, for example, the pilot may select "Center Map", "Intercept", Show Info . . . ", "Offset", "Create Waypoint . . . ", "Cross . . . ", "Go Direct . . . ", "Amend Route", and the like. To select an option from the options menu 300, the pilot suitably indicates the desired option (e.g. by positioning the cursor over the option, by scrolling through the options with a button or knob, by depressing a key on a keypad, or the like) and activates the selection by depressing a button or otherwise indicating the desired option through user interface 110 (FIG. 1). Of the options shown in exemplary menu 300, the four options "Show Info . . . ", "Create Waypoint . . . ", "Cross . . . ", and "Go Direct . . . " contain a succession of periods to indicate that further information is available in the form of a dialog box. After the pilot selects an option, a dialog box may be presented on display device 102 to provide additional detail about the selected option, or to obtain additional information about the selection.

Figure 4:
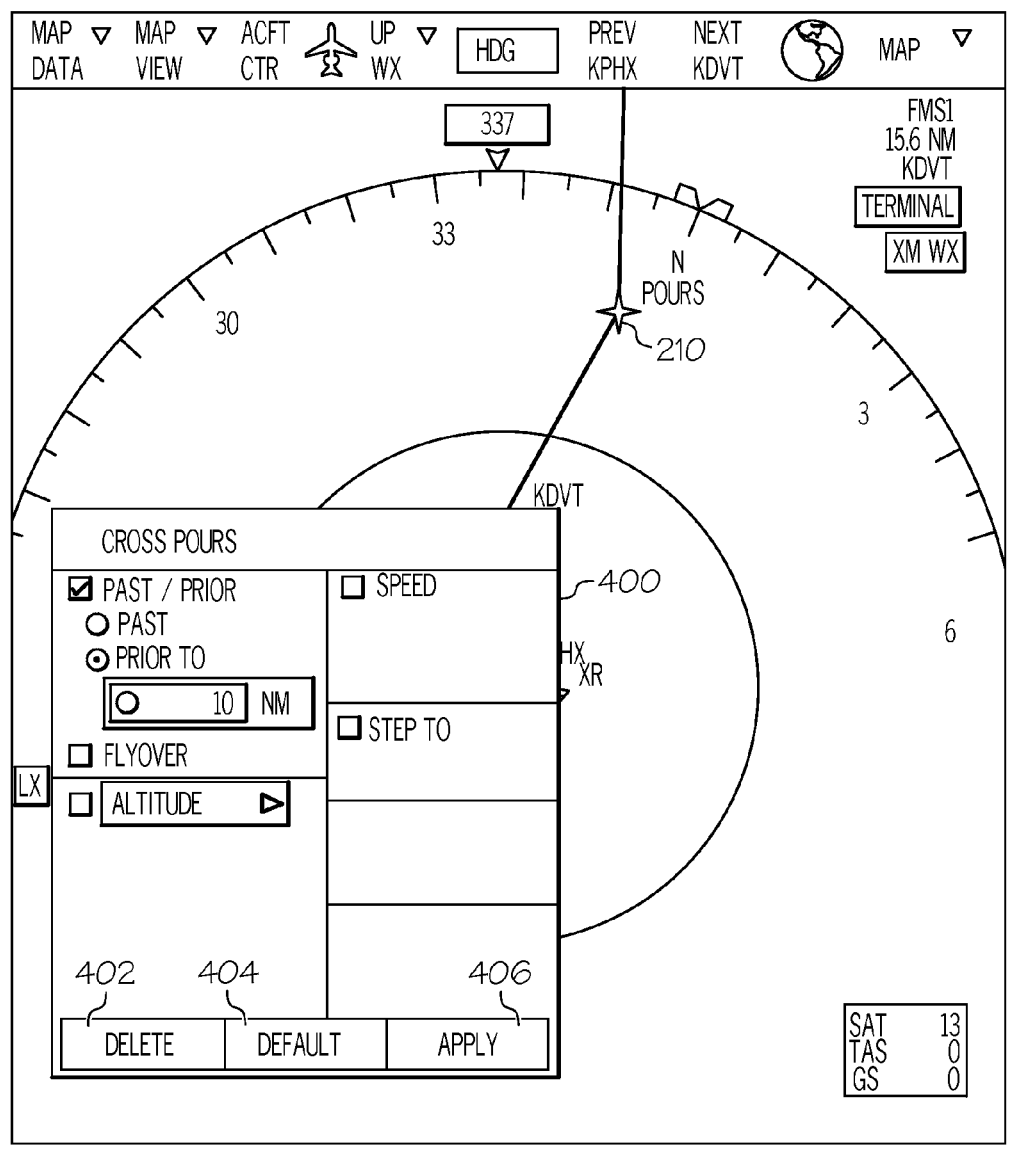
FIG. 4 depicts a dialog box displayed over a portion of the navigational map shown in FIG. 2 in accordance with the prior art.

FIG. 4 shows an exemplary "Cross" dialog box 400 for creating an Along Track Waypoint (ATW) or a Place Bearing Distance (PBD) waypoint. The exemplary dialog box suitably includes a "Delete" button 402, a "Default" button 404, and an "Apply" button 406. Buttons 402 and 406 suitably cancel and apply, respectively, the changes made by the pilot since opening box 400. The Delete button 402 suitably deletes the changes entered by the pilot but does not close dialog box 400. "Default" button 404 may also be activated to retrieve information from the navigation database 120 or other appropriate source.

Referring to FIG. 4, "Cross" dialog box 400 performs multiple operations such as inserting an ATW or PD waypoint, inserting an altitude constraint, inserting a speed constraint, and so on. A crew member opens the "Cross" dialog box by clicking on a flight plan waypoint and subsequently selecting "CROSS . . . ." An ATW is a waypoint along the track of the flight plan at a specified distance from or to a waypoint. Referring again to FIG. 4, an ATW waypoint is being created using POURS as a reference waypoint. A crew member may set a distance "Past" or "Prior to" in box 408. After selecting "Prior to" and a distance of 10 NM as shown, the ATW POU01 is created on the flight segment KDVT-POURS, at a distance of 10 NM from reference waypoint POURS. If "Past" and "10 NM" had been selected, the new ATW POU01 would be created on the next flight segment, at a distance of 10 NM from reference waypoint POURS. A crew member then clicks on "Apply" 406 to effect the change or "Delete" 402 to reset it. Although the values shown in FIG. 4 relate to conventional aviation units used in the United States (e.g. knots, nautical miles, and the like), it will of course be appreciated that these units could be converted or displayed using any system of measurements, including, e.g., System International (SI) units. Airspeed, for example, could be displayed in knots, kilometers/second, Mach number, or any other units.

As referred to previously, dialog box 400 may occupy a large portion of the display and, therefore, block and hide that portion of the display beneath the dialog box including portions of the existing flight plan, terrain, weather, traffic, and ADS-B IN data. The problem is exacerbated because the dialog box is stationery and cannot be moved as, for example, by dragging with a cursor to reveal what is underneath. In addition, the waypoint is created by adjusting values in the dialog box, which may be problematic.

It is contemplated that the embodiments described herein provide a system and method for producing and/or modifying a waypoint in a flight plan in a manner that provides immediate feedback to the pilot by utilizing direct graphical entry on the existing flight plan graphic using, for example, a touchscreen on cursor type input device. The result may be characterized as a what-you-see-is-what-you-get (WYSIWYG) device and procedure for creating or changing a waypoint. This increases a pilot's situational awareness by permitting modifications directly on the existing flight plan display and not on a reproduction thereof and without covering or hiding any substantial portion of the display or the features being displayed on the display including the aircraft symbol, the existing flight plan, weather, traffic, and the like.

Figure 5:
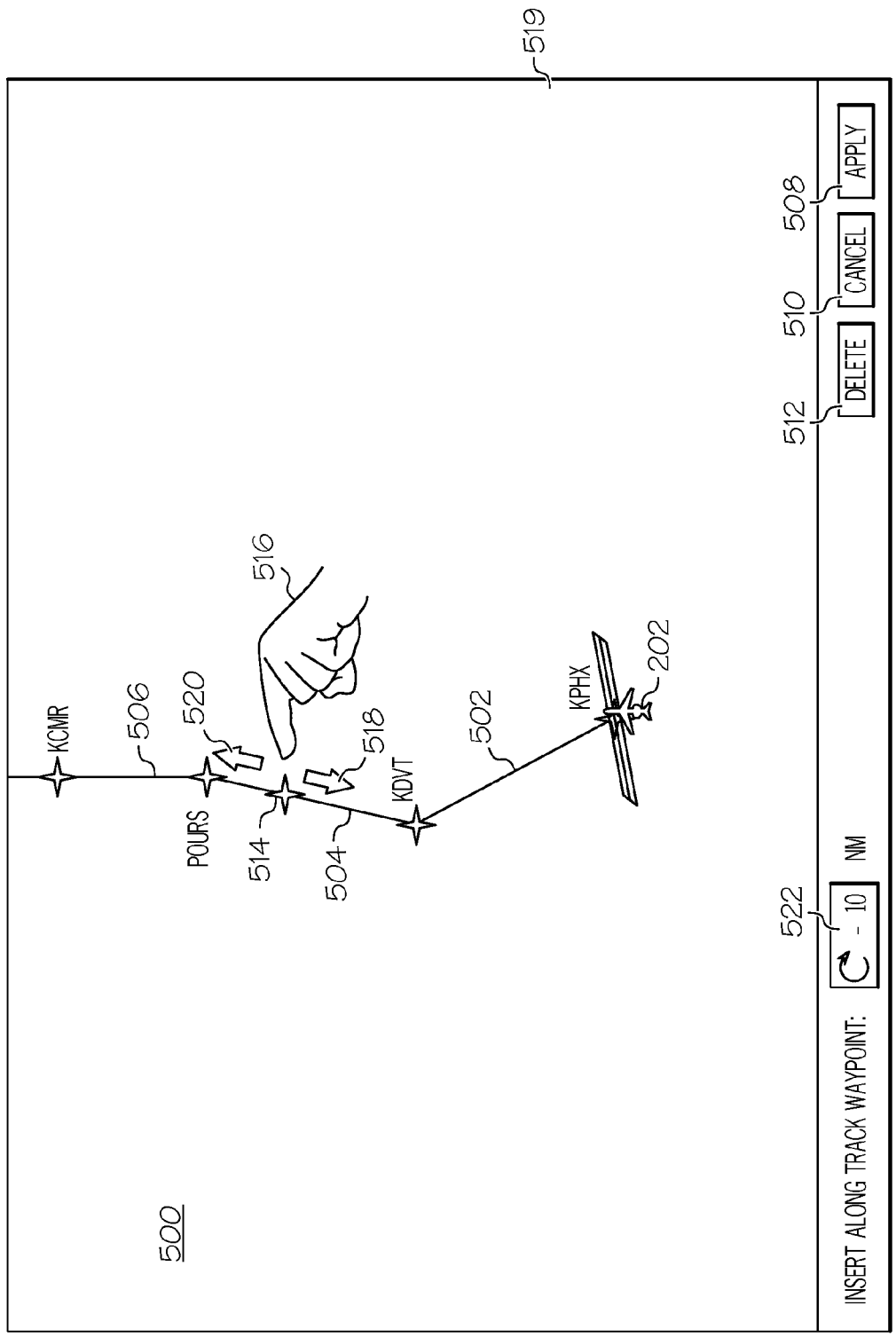
FIGS. 5 and 6 depict displayed flight plan images on a navigational map and illustrate how an ATW or PD waypoint may be inserted into a flight plan in accordance with an exemplary embodiment.
Figure 6:
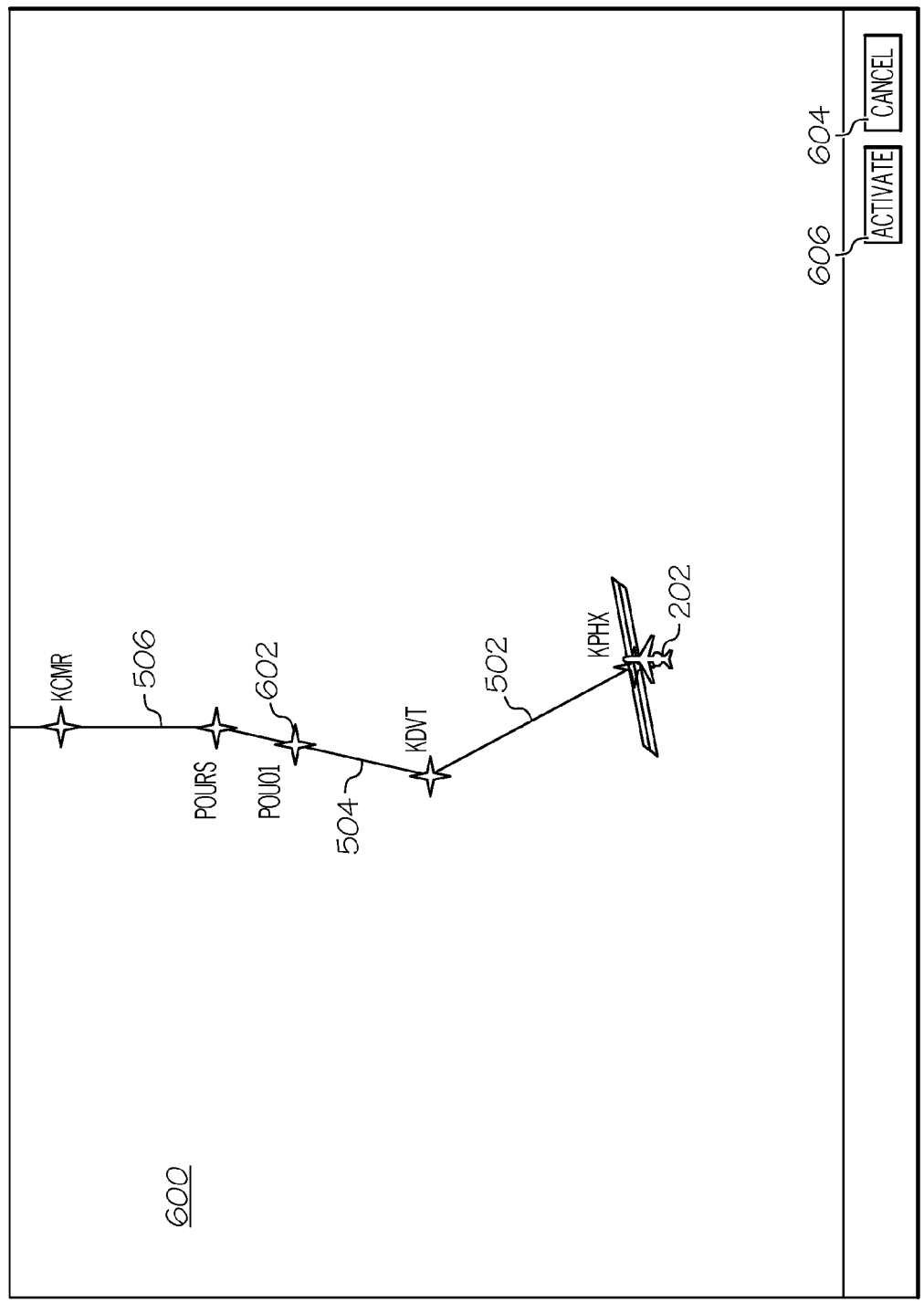

FIGS. 5 and 6 illustrate an interactive graphical displays of flight plan images 500 and 600 respectively, comprised of segments 502, 504, and 506 and including waypoints KPHX, KDVT, and POURS, and wherein a pilot or other crew member wishes to insert an ATW or PD waypoint in accordance with an exemplary embodiment. Flight plan image 500 includes APPLY and DELETE buttons 508 and 512, respectively. Also, the display includes a waypoint symbol 514 that defines the location of the proposed new waypoint. However, unlike the process described in connection with FIG. 4, the pilot or crew member is not required to adjust the values in this box to view the corresponding result of the adjustments. It should be understood, however, that a pilot or user may adjust the values in (1) these boxes, (2) on the touch screen using gestures, or (3) on a non-touch screen using a cursor control device.

In accordance with an embodiment and referring to FIG. 5, after the CREATE WAYPOINT is selected, a crew member clicks on POURS (the reference waypoint), selects "CREATE WAYPOINT . . . " from the task menu, and arrives at a screen similar to that shown in FIG. 5. A proposed new waypoint 514 is initially placed on reference waypoint 210 (POURS) in, for example, a different color, to differentiate and easily identify the newly created waypoint. A crew member then may slide the waypoint symbol (POU01) along the track of the flight plan on either side of the reference waypoint POURS 210. However, the crew cannot slide the new waypoint past the waypoint on either side of the reference waypoint. Alternatively, the crew could adjust the values in the text entry field 522. A negative distance is equivalent to selecting "Prior To", and a positive distance is equivalent to selecting "Past" in FIG. 4. Arrows 518 and 520 are shown for illustration purposes only to indicate that the crew can slide the new waypoint symbol in the directions of the arrows.

The DELETE button 512 in FIG. 5 may be used to reset the position of the newly created waypoint to its initial position: i.e. on top of reference waypoint 212. CANCEL button 510 may be used to abort the CREATE WAYPOINT operation. APPLY button 508 is used to confirm and accept the changes and proceed to the next step.

Referring now to FIG. 6, the newly inserted waypoint (POU01) 602 may be cancelled by touching "CANCEL" 604 or activated by touching "ACTIVATE" 606 Thus, the pilot or crew member is effectuating the flight plan change on the flight plan image itself as opposed to doing so on a reproduced portion of the flight plan, thus giving the pilot or crew member the benefit of viewing the change in the context of the entire flight plan including traffic, weather, terrain, and ADS-B IN (not shown for clarity) much of which would be hidden if the dialog box approach were used. It should be clear that while the above described embodiments have been described in connection with a touchscreen input device, the principles described are equally applicable to the use of other input devices (110 on FIG. 1) such as a cursor control input device. In addition, it should be clear that the gestures suggested in FIG. 5 and associated with waypoint insertion are only exemplary. Other gestures may be utilized to achieve desired results.

Figure 7:
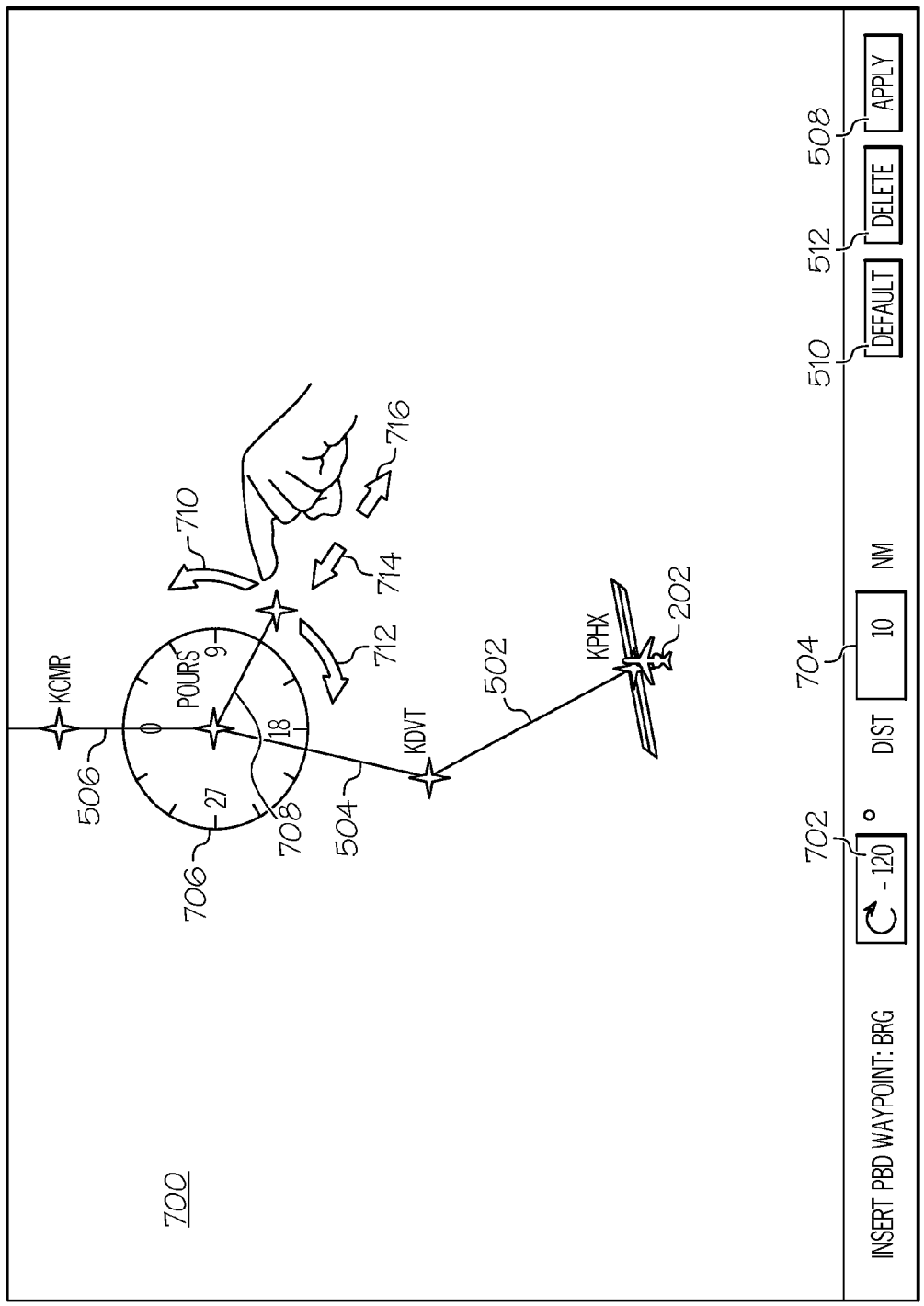
FIGS. 7 and 8 depict displayed flight plan images on a navigational map and illustrate how a PBD waypoint may be inserted into a flight plan in accordance with a further exemplary embodiment.
Figure 8:
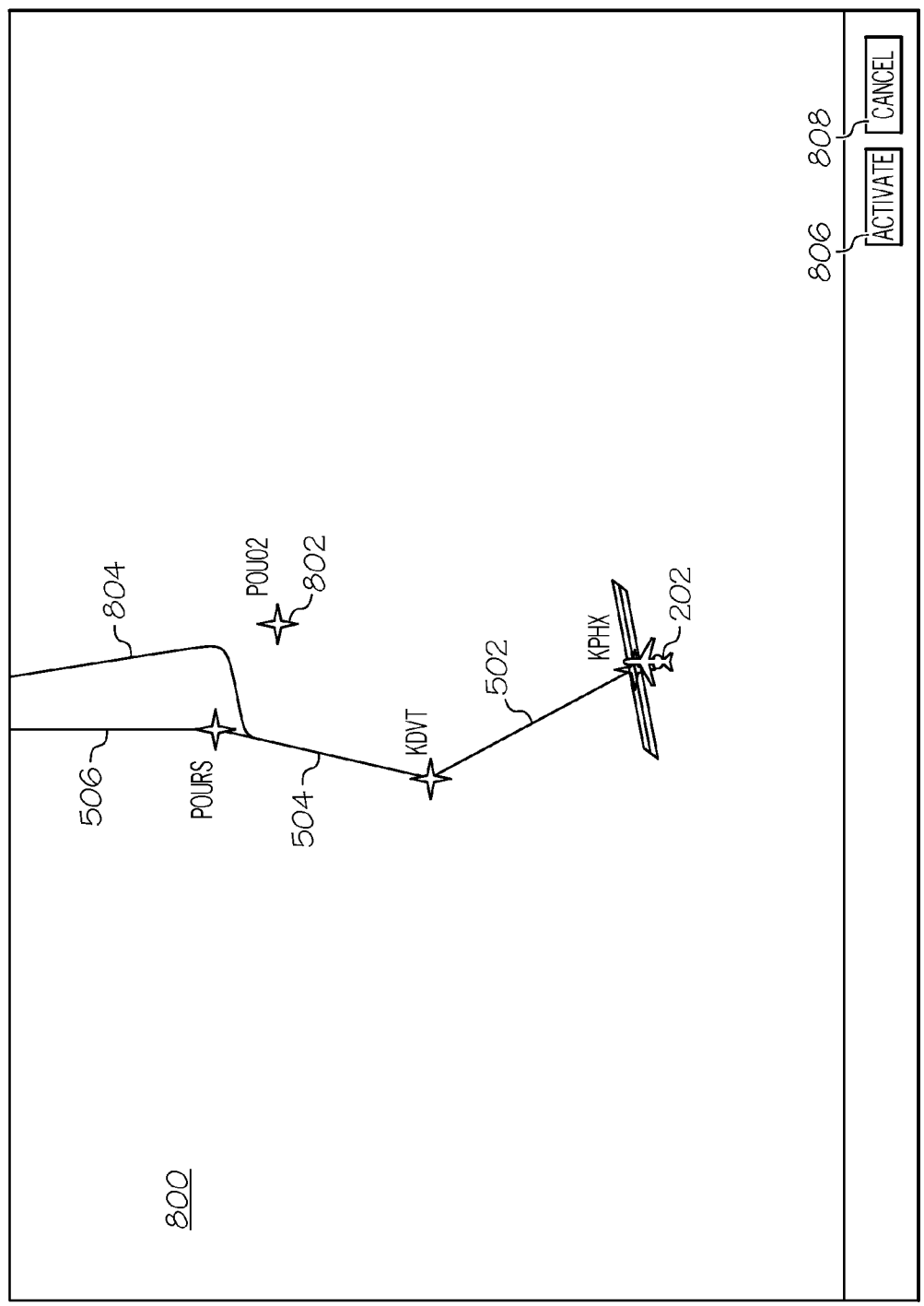
Figure 9:
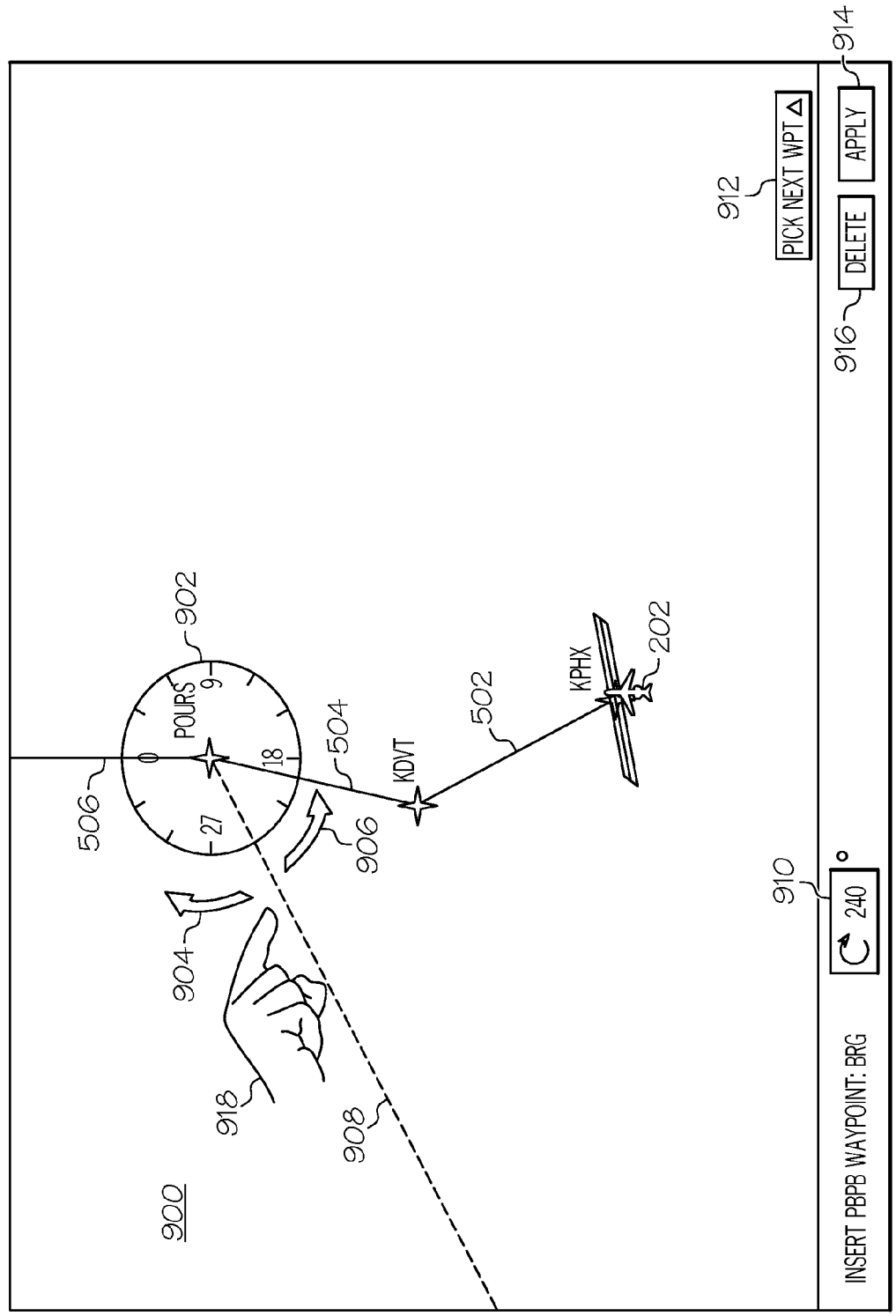
FIGS. 9-12 depict displayed flight plan images on a navigational map and illustrate how a PBPB waypoint may be inserted into a flight plan in accordance with a still further exemplary embodiment.

FIGS. 7 and 8 illustrate an interactive graphical method for inserting a PBD waypoint in accordance with a further exemplary embodiment. Graphical displays of flight plan images 700 and 800 respectively, once again comprise segments 502, 504, and 506 and include waypoints KPHX, KDVT, and POURS, wherein a pilot or other crew member wishes to insert a PBD waypoint. Flight plan image 700 includes APPLY and DELETE buttons 508 and 512, respectively. Also, the display includes a bearing entry field (BRG) 702 and a distance entry field in Nautical Miles (DIST) 704 that defines the location of the proposed new waypoint. Once again, the pilot or crew member is not required to adjust the values in these boxes to view the corresponding result of the adjustments. It should be understood, however, that a pilot or user may adjust the values in these boxes, (1) on the touch screen using gestures, or (2) on a non-touch screen using a cursor control device or the like.

In accordance with an embodiment, after the CREATE WAYPOINT task is selected on POURS from a menu such as the one shown in FIG. 3, compass rose 706 centered on the reference waypoint POURS and line 708 extending from waypoint POURS are displayed. Using a finger, stylus, or the like, the bearing may be adjusted by dragging around bearing indicator 702 in directions indicated by arrows 710 and 712. Similarly, the length of segment 708 may be altered by dragging in the directions indicated by arrows 714 and 716. The signals created by movement along touchscreen 519 are sensed by graphics module 114 (FIG. 1) and continuously transmitted to processor 112 where they are converted to reflect their numerical equivalents. The numerical results of this process (the bearing and distance) will automatically appear in boxes 702 and 704, respectively. When complete, the results may be either deleted or applied using buttons 512 or 508, respectively. If the new flight plan is applied (button 508), it will be displayed as shown in FIG. 8 as new waypoint symbol 802 and new course 804. This new flight plan may then be activated if acceptable or cancelled using buttons 806 and 808, respectively. Initially, the flight plan KPHX-KDVT-POURS-KCMR are connected by straight lines. Within a few seconds, a module within the flight management system determines that it would not be practical to fly the flight plan with two sharp turns to be performed at POU02 at such a high speed. So it smoothes those segments to make them flyable at high speed. Hence, these segments don't really touch upon the waypoints.

Once again, it should be clear that while the above described embodiment has been described in connection with a touchscreen input device, the principles described are equally applicable to the use of other input devices (110 on FIG. 1). In addition, it should be clear that the gestures suggested in FIG. 7 and associated with waypoint insertion are only exemplary, and other gestures may be utilized to achieve the desired results.

FIGS. 9-12 illustrate interactive graphical displays of a flight plan images 900, 1000, 1100, and 1200 respectively, once again comprised of segments 502, 504, and 506 and including waypoints KPHX, KDVT, and POURS, and wherein a pilot or other crew member wishes to insert a Place-Bearing-Place-Bearing (PBPB) waypoint in accordance with a further exemplary embodiment. Flight plan images 900, 1000, and 1100 include bearing box 910 and APPLY and DELETE buttons 914 and 916, respectively, that function as previously described in connection with FIG. 7. In addition, a bearing line 908 is displayed and adjusted by dragging with a finger, stylus, or the like in the directions indicated by arrows 904 and 906 also previously described. Display screen 900 also includes a bearing display box (BRG) 910 that depicts the bearing of line 908. Once again, the pilot or crew member is not required to adjust the values in this box to view the corresponding result of the adjustments. It should again be understood, however, that a pilot or user may adjust the values in these boxes, (1) on the touch screen using gestures, or (2) on a non-touch screen using a cursor control device or the like.

Figure 10:
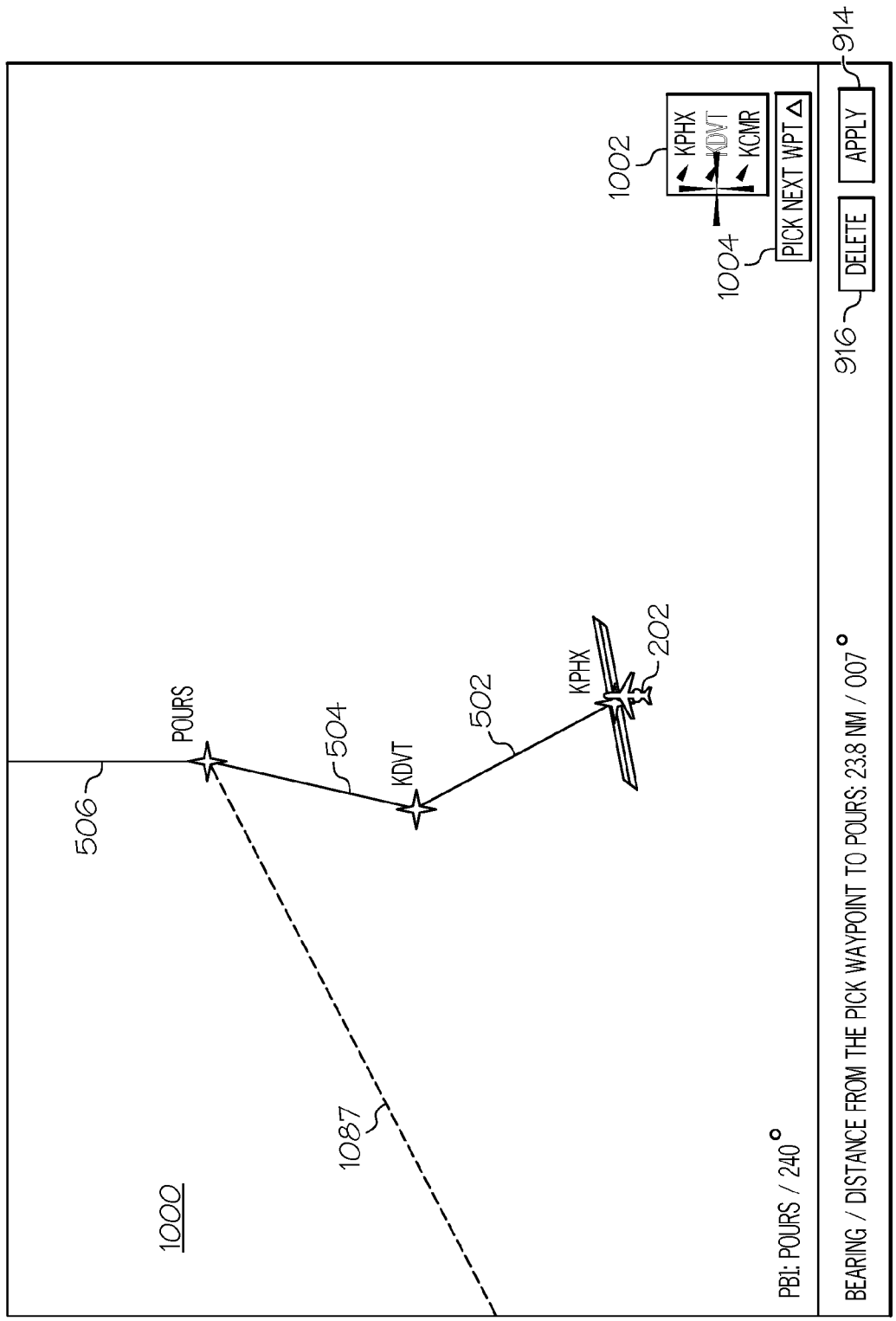

In accordance with this embodiment, a bearing represented by line 908 is selected and shown as dotted indicating that thus far, no intersection has been found. If the process is to continue, button 912 (PICK NEXT WAYPOINT) is selected by clicking. This results in the display of a waypoint menu 1002 on display screen 1000 listing all waypoints in the flight plan including those outside the visible area of the display (e.g. KCMR) as shown in FIG. 10. Also displayed is a PICK NEXT waypoint button that is utilized to select one of the waypoints in menu 1002 by clicking the appropriate waypoint listed in the menu and not clicking the PICK NEXT waypoint button.

Figure 11:
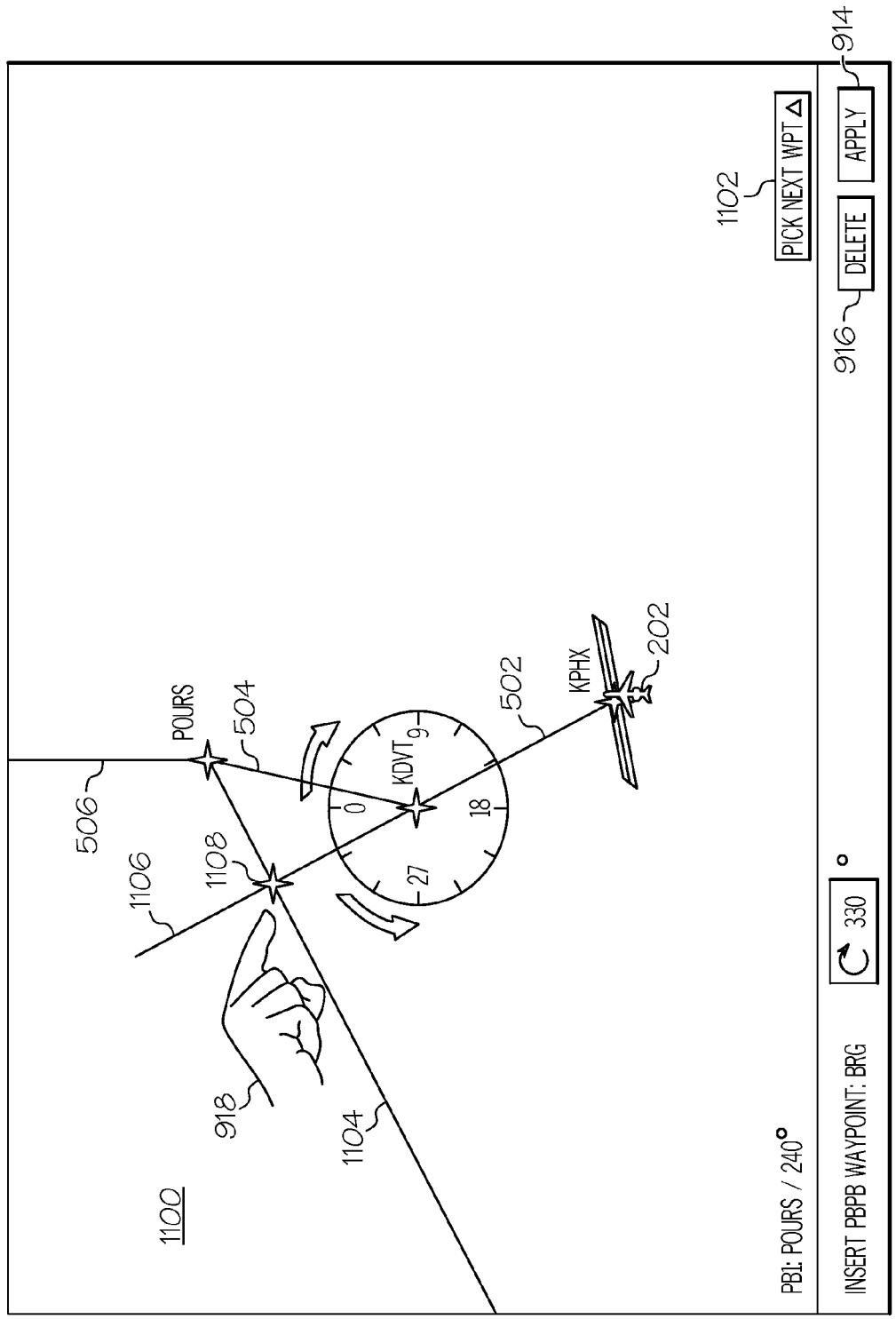
Figure 12:
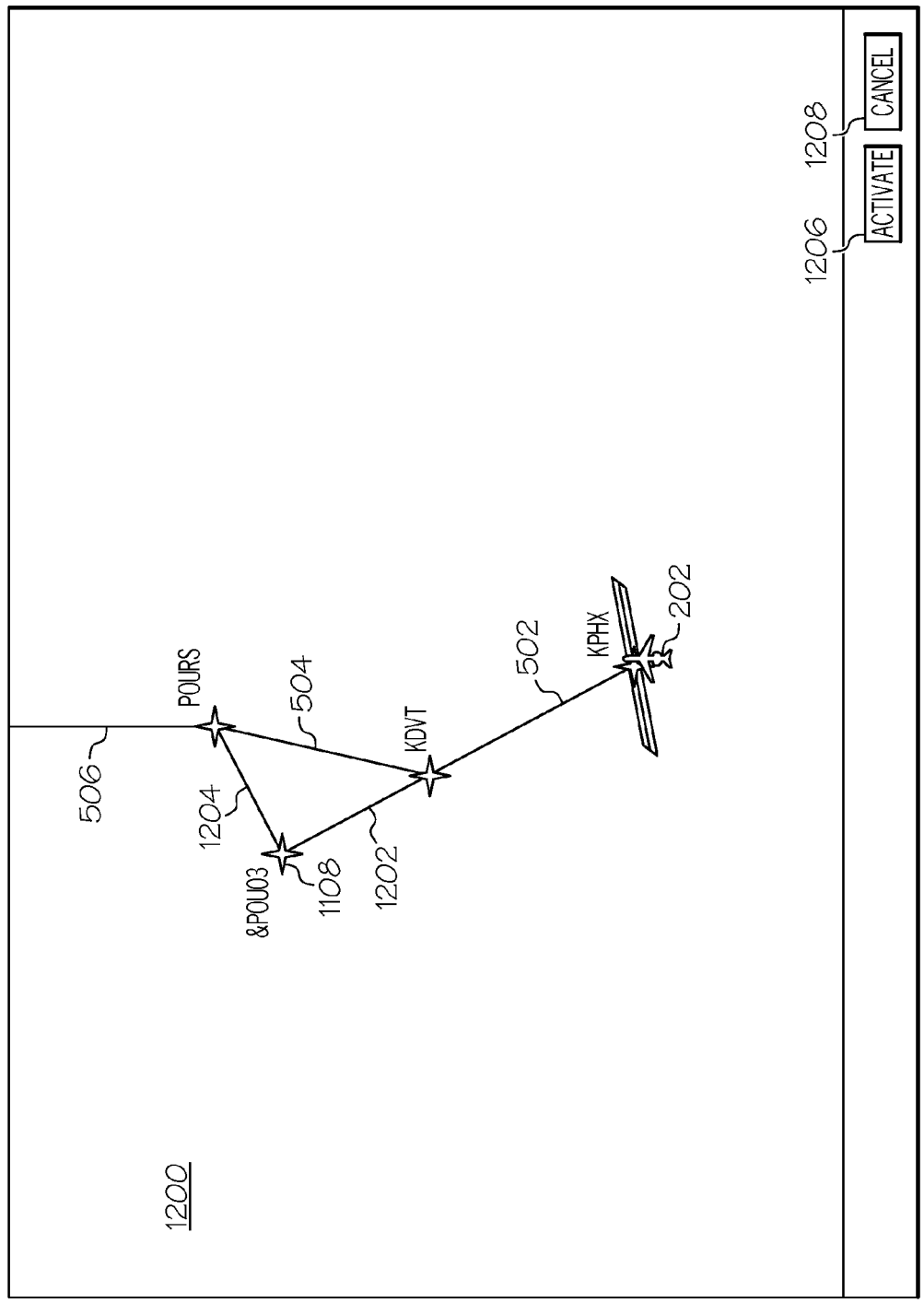

Referring next to FIG. 11, display screen 1100 illustrates the situation after a second waypoint has been selected. The second bearing associated with the second waypoint is selected in a similar manner as described above for selecting the bearing of the first waypoint. The solid nature of lines 1104 and 1106 indicate that an intersection 1108 has been found. This is true even if both selected waypoints are not in the visible range of the display. If lines 1104 and 1106 are dashed, there is no intersection found, and a waypoint cannot be created. This represents a valuable visual cue, especially when working on large flight plans and when one of the reference waypoints is not in the visible range. Finally, the display screen 1200 in FIG. 12 displays new waypoint (POU03) at the junction of new segment 1202 (between waypoints POU03 and POURS) and new segment 1204 (between waypoints POU03 and KDVT). The new flight plan may then either be activated (button 1206) or cancelled (button 1208).

Figure 13:
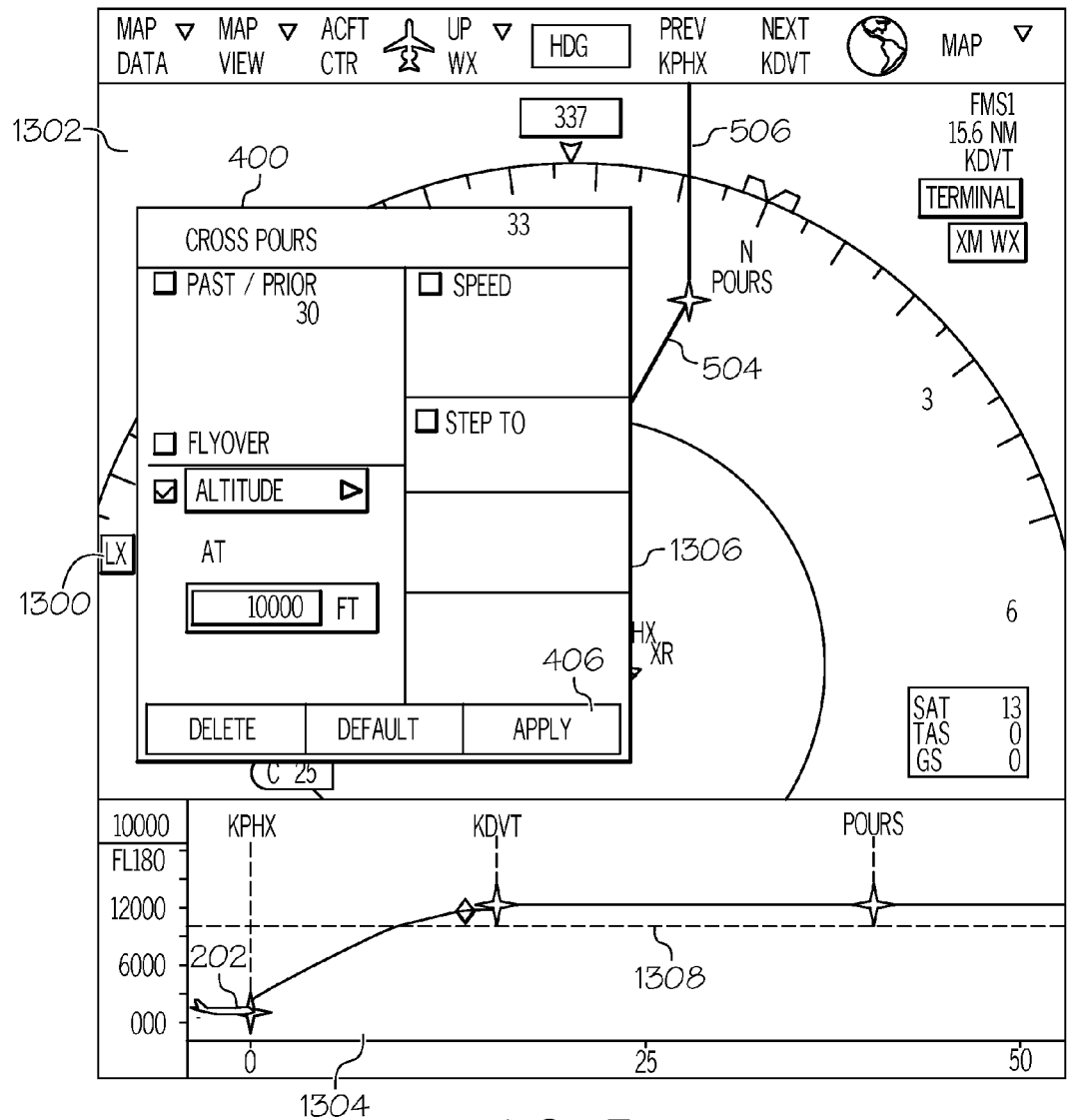
FIG. 13 depicts a dialog box displayed over a portion of the navigational map illustrating how an altitude constraint may be inserted into a flight plan in accordance with the prior art.

Referring now to FIG. 13, there is shown a navigation display 1300 comprising a horizontal map display 1302 and a vertical situation display 1304. A pilot may create an altitude constraint by selecting the appropriate item from an options menu such as that shown in FIG. 3 and displaying dialog box 1306 shown in FIG. 13, as was previously described. That is, the "Cross POURS" dialog box 400 (FIG. 4) may be used to insert an altitude constraint. As can be seen in FIG. 13, "Altitude" has been selected in dialog bow 400 to provide an altitude constraint at 10,000 feet as indicated by dotted line 1308. The APPLY button 406 inserts the altitude constraint on the waypoint POURS; however, as was the case previously, the changes are not visible to the crew until the APPLY button activates the pending flight plan. Unfortunately, dialog box 1300 may occupy a large portion of the display and therefore block and hide that portion of the display beneath the dialog box including portions of the existing flight plan, terrain, weather, traffic, and ADS-B IN data. As previously stated, the problem is exacerbated because the dialog box is stationery and cannot be moved as, for example, by dragging with a cursor, to reveal what is underneath. In addition, the altitude constraint is created by adjusting values in the dialog box. To make matters worse, the actual changes made to the vertical display flight plan are not displayed.

Figure 14:
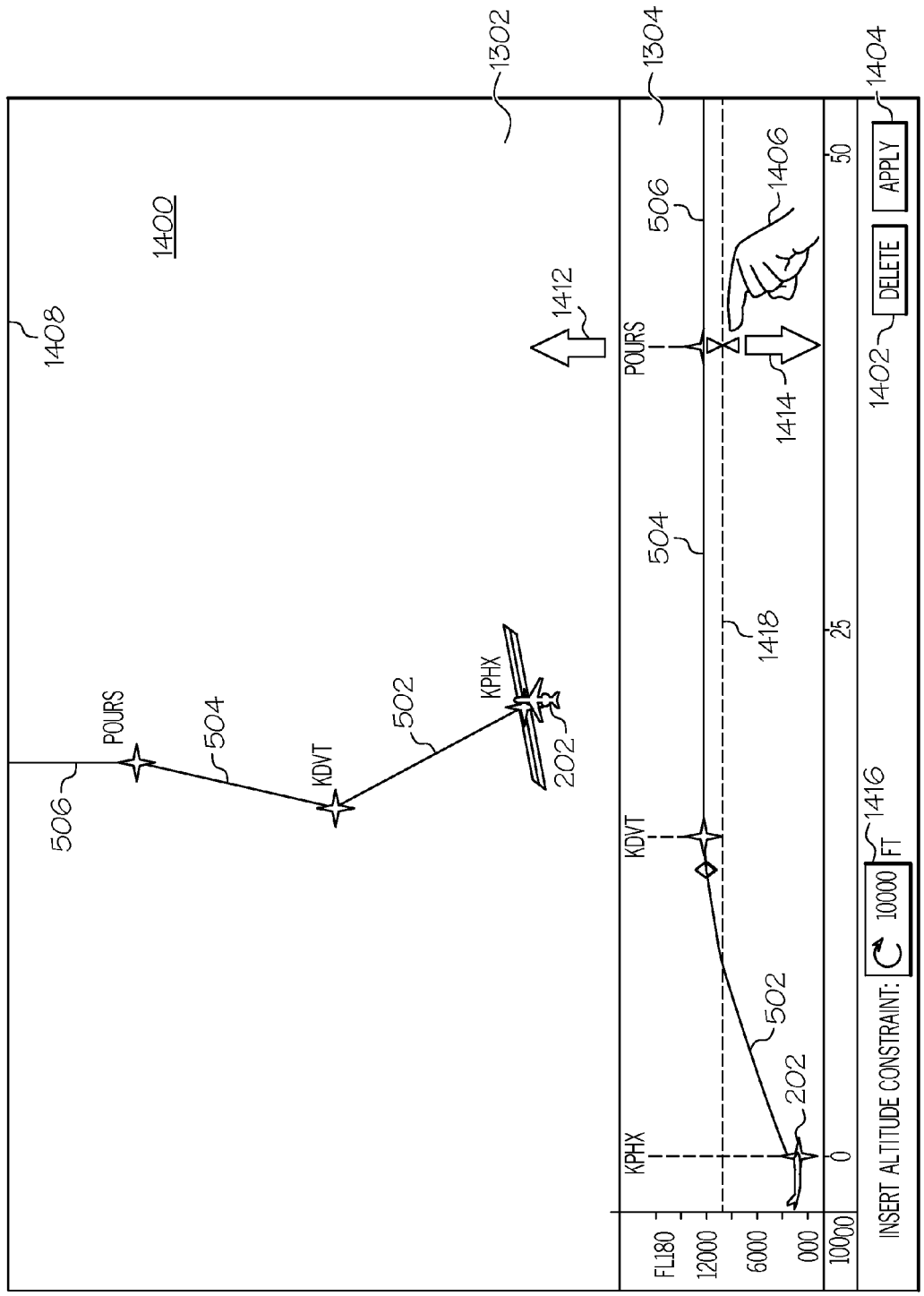
FIGS. 14-16 depict displayed flight plan images on a navigational map and illustrate how an altitude constraint may be inserted into a flight plan in accordance with yet another exemplary embodiment.
Figure 15:
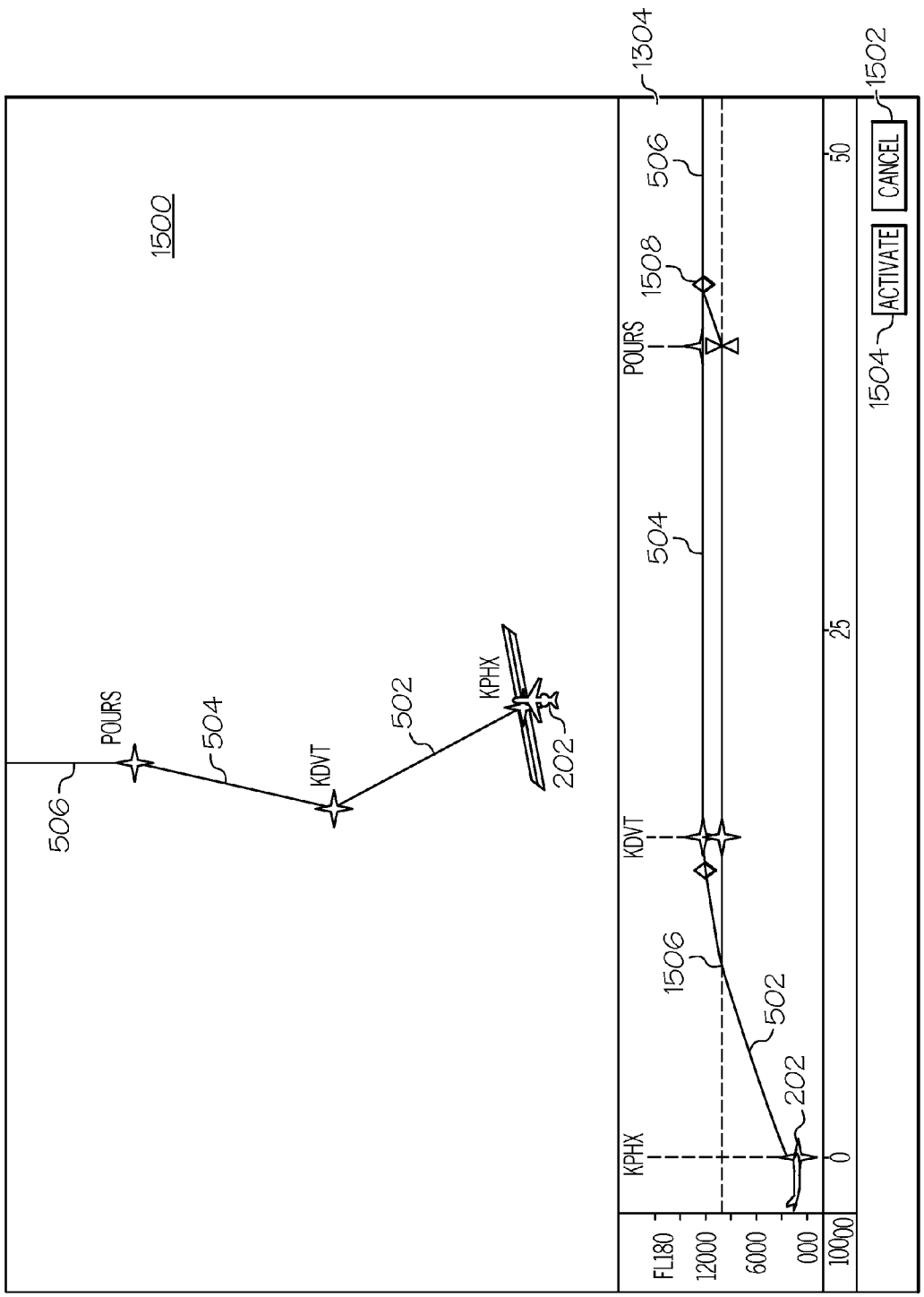
Figure 16:
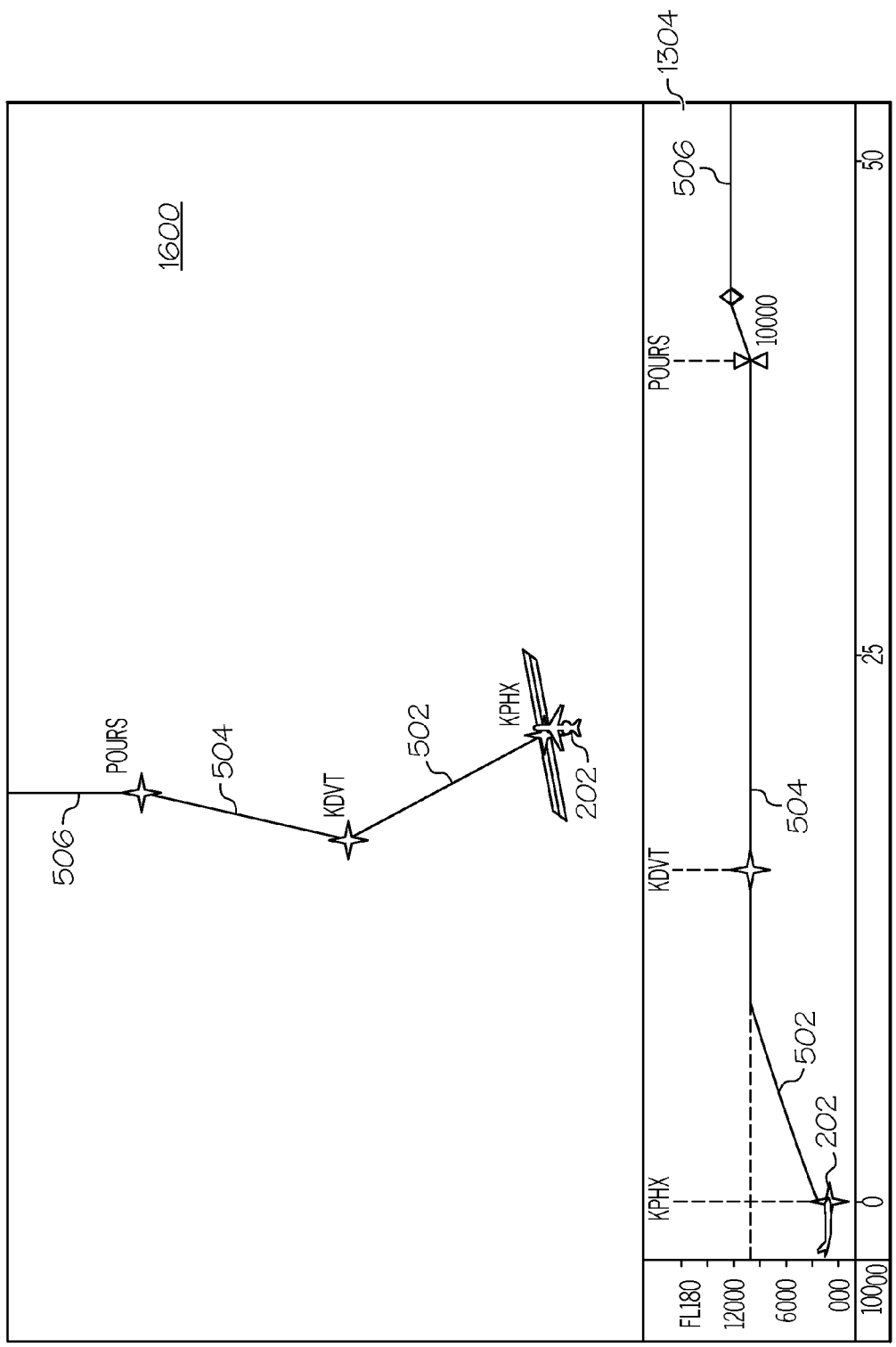

Referring to FIGS. 14, 15, and 16, the same lateral flight plan as previously described is shown. That is, the flight plan comprises a first segment 502, a second segment 504, and a third segment 506 as shown on the lateral map display 1302 and the vertical situation display 1304. As can be seen in FIG. 14, portions of the existing flight plan between KDVT and POURS call for an altitude of approximately of approximately 12,000 feet. However, in the same example, it is desirable to impose an altitude constraint of 10,000 feet. This desired altitude constraint may be created by sliding a finger between the top 1408 of the lateral map display and bottom 1410 of the vertical situation display as indicated by arrows 1412 and 1414, respectively. This larger scale compared to the top and bottom of the vertical situation display provides easier and more precise selection of altitude, even in small increments. This distance is detected, converted to a numerical value, and displayed in box 1416 as previously described. In the instant example, the distance is adjusted until it reaches the desired altitude constraint of 10,000 feet as indicated in window 1416 and reflected by dotted line 1418. Edges 1408 and 1410 are mapped to the maximum and minimum values for a given waypoint, thereby avoiding any out-of-range values. At this point, the proposed altitude constraint may be deleted or applied via buttons 1402 and 1404, respectively.

If the proposed altitude constraint indicated by dashed line 1418 is applied, the selected altitude constraint will be inserted into the pending flight plan, and display screen 1500 will appear as shown in FIG. 15. That is, that portion of dashed line 1418 in FIG. 14 subject to the new altitude constraint will become solid. In this manner, changes to the flight plan may be seen prior to accepting them. The proposed flight plan may be cancelled or activated via buttons 1502 and 1504, respectively. If activated, the new flight plan will be inserted as shown on display screen 1600 in FIG. 16.

Figure 17:
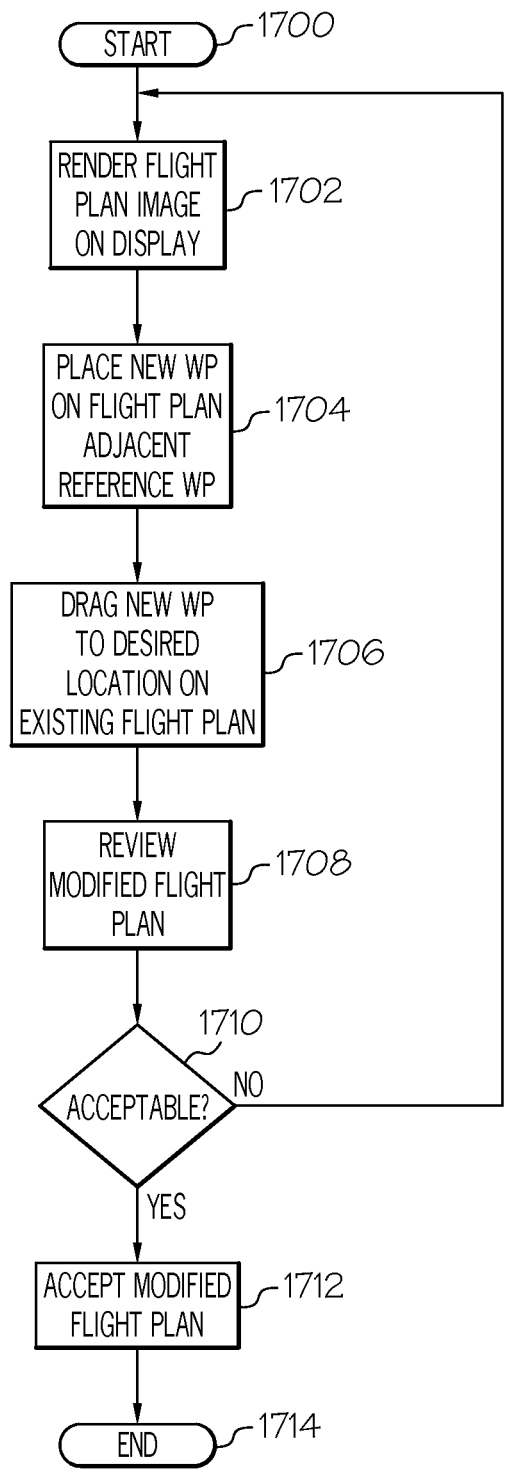
FIG. 17 is a flowchart of a display process for modifying a flight plan by inserting a new ATW or PD waypoint in accordance with an embodiment.

FIG. 17 is a flowchart 1700 of an interactive display process for modifying an existing a flight plan by inserting a new ATW or PD waypoint into an existing flight plan in accordance with an exemplary embodiment. First, a flight plan image is rendered on the display (STEP 1702). Next, in STEP 1704, new waypoint symbology is rendered on the flight plan in the vicinity of a reference waypoint. In STEP 1706, the new waypoint symbology is dragged to a new desired location on the flight plan. As already described, the distance from the reference waypoint is numerically displayed on the display. The flight plan containing the new waypoint is then reviewed (STEP 1708), and if it is found to be acceptable (STEP 1710), the flight plan is modified accordingly (STEP 1712), and the process ends (STEP 1714).

Figure 18:
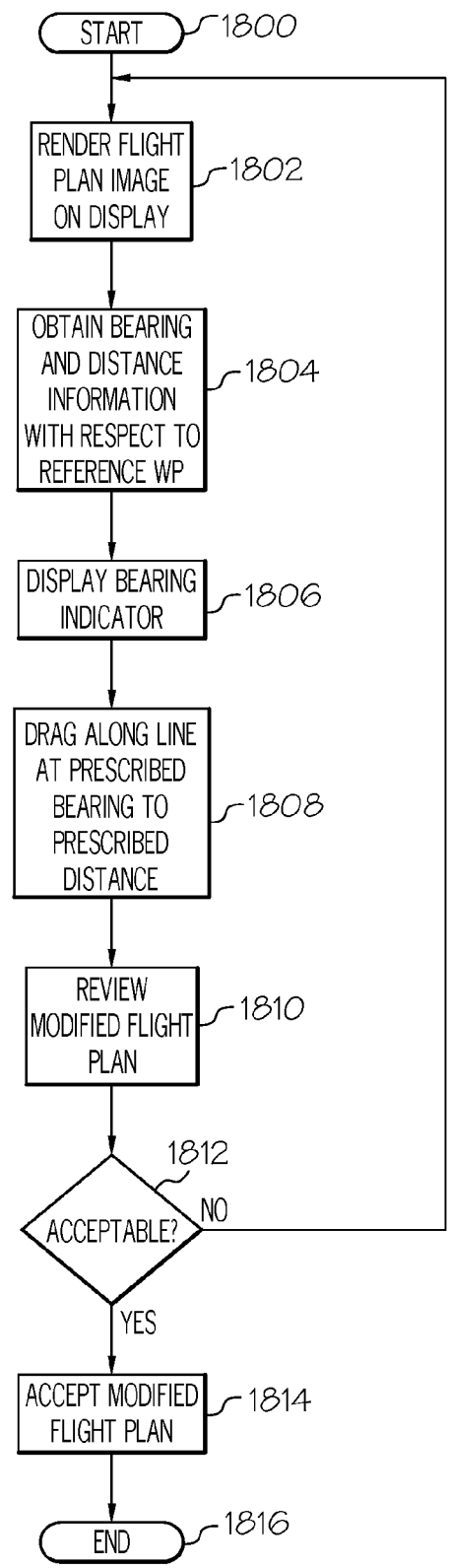
FIG. 18 FIG. is a flowchart of a display process for modifying a flight plan by inserting a new PBD waypoint in accordance with an embodiment.

Next, FIG. 18 is a flowchart 1800 of an interactive display process for modifying a flight plan by inserting a new PBD waypoint into an existing flight plan in accordance with an exemplary embodiment. As was the case previously, the process begins by rendering a flight plan on a display (STEP 1802). In STEP 1804, graphics module 114 (FIG. 1) receives bearing and distance information, and a bearing indicator is displayed (STEP 1806). The operator may then drag a potential new waypoint positioned thereon to the prescribed distance and rotate the bearing line by dragging to the correct bearing (STEP 1808). At this point, the proposed new flight plan containing the new waypoint is shown in a preliminary format and may be reviewed on the display (STEP 1810). If the new flight plan is found to be acceptable (STEP 1812), it may be accepted (STEP 1814) and the process ends (STEP 1816).

Figure 19:
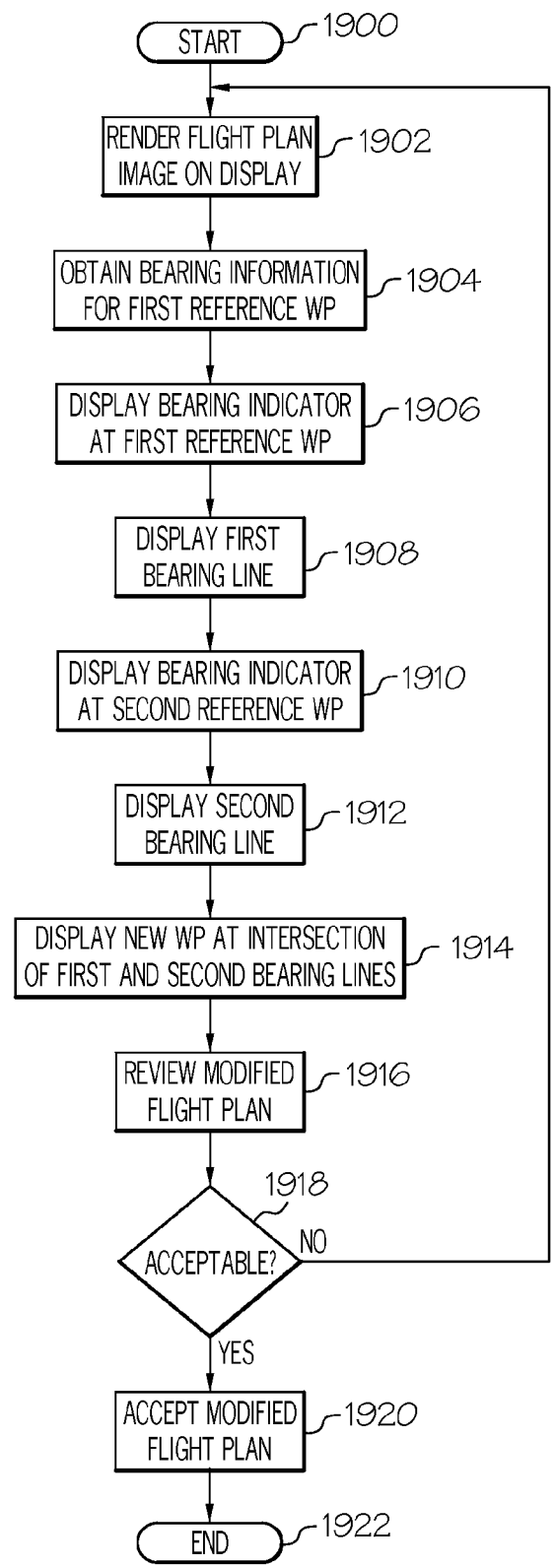
FIG. 19 is a flowchart of a display process for modifying a flight plan by inserting a new PBPB waypoint in accordance with a further exemplary embodiment.

FIG. 19 is a flowchart of an interactive display process 1900 for modifying a flight plan by inserting a new PBPB waypoint into an existing flight plan in accordance with a further exemplary embodiment. Once again, the process begins by rendering a flight plan on a display (STEP 1902). In STEP 1904, bearing information from first and second reference waypoints is retrieved. A bearing indicator is displayed at the first reference waypoint (STEP 1906), and a first bearing line to the new waypoint is displayed (STEP 1908). Next, a second bearing indicator is displayed at the second reference waypoint (STEP 1910), and a second bearing line to the new waypoint is displayed (STEP 1912). The new waypoint location is displayed at the intersection of the first and second bearing lines (STEP 1914), the proposed flight plan is reviewed (STEP 1916), and if found to be acceptable (STEP 1918), the new waypoint is activated (STEP 1920).

Figure 20:
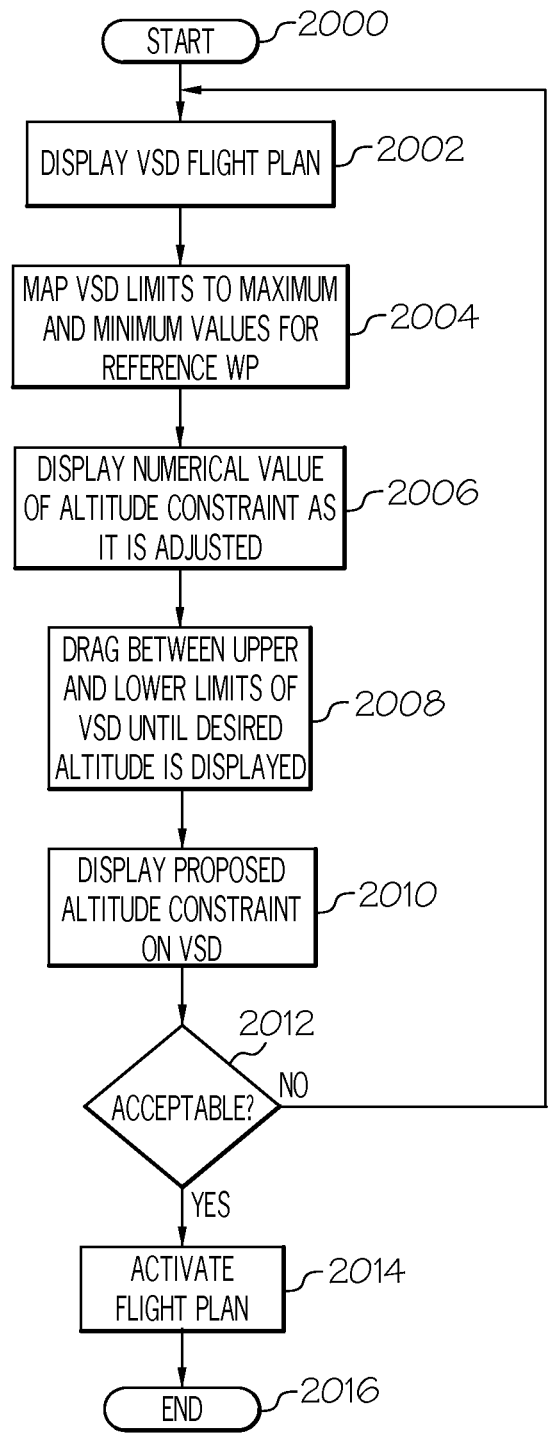
FIG. 20 is a flowchart of a display process for modifying a flight plan by inserting an altitude constraint in accordance with a further exemplary embodiment.

FIG. 20 is a flowchart of an interactive display process 2000 for inserting a new altitude constraint into a flight plan on a vertical situation, interactive display in accordance with a further exemplary embodiment. First, a flight plan is rendered on a vertical situation display (STEP 2002). A preliminary view of the new altitude constraint is then created by dragging vertically between the upper edge of the lateral map display and the lower edge of the vertical situation display (STEP 2004). These edges are mapped to the maximum and minimum altitude values at the reference waypoint to avoid out of range values (STEP 2006). The numerical value of the altitude is displayed in a window on the display as the altitude is adjusted (STEP 2008). When the desired altitude has been reached, the new flight plan is displayed (STEP 2010) and if found to be acceptable (STEP 2012), the new flight plan is activated (STEP 2014) and the process ends (STEP 2016).

Thus, it should be appreciated that there has been provided a system and method for producing and/or modifying a flight plan in a manner that provides immediate feedback to the pilot and that utilizes direct graphical entry on the existing flight plan image thus avoiding the need for dialog boxes that block portions of the display including traffic, weather, terrain, ADS-B IN, and the existing flight plan itself. While an exemplary embodiment of the present invention has been described above in the context of a fully functioning computer system (i.e., avionics display system 100), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for positioning a new waypoint in a flight plan displayed on an avionics display in the form of an interactive graphical image, the method comprising:

processing user input to select an existing waypoint in the flight plan;

generating, adjacent the selected waypoint, symbology on the display graphically representative of the new waypoint on the flight plan;

dragging the new waypoint on the display a predetermined distance from the selected waypoint to alter its position and to create a new flight plan;

displaying symbology representative of the numerical distance that the new waypoint is being dragged relative to the selected waypoint;

generating symbology representative of whether the new waypoint is being dragged to a position prior to or past the selected waypoint;

applying the new waypoint to the flight plan; and processing user input to activate the new flight plan.

2. The method of claim 1 wherein the step of dragging is performed with a cursor.

3. The method of claim 1 wherein the display is a touchscreen and the step of dragging is performed with a finger.

4. The method of claim 1 wherein the step of dragging comprises positioning the new waypoint between first and second existing waypoints.

5. The method claim 4 further comprising limiting movement of the new waypoint to a track between the first and second waypoints on an existing flight plan.

6. The method of claim 1 wherein the new waypoint is an ATW waypoint.

7. The method of claim 1 wherein:
the new waypoint is a position-distance waypoint.

8. The method of claim 1 further comprising:
displaying a compass rose centered on the selected waypoint;
altering the bearing of the new waypoint relative to the existing waypoint; and
altering the distance from the existing waypoint by dragging the new waypoint toward or away from the existing waypoint.

9. The method of claim 8 further comprising displaying symbology numerically representative of the bearing of the new waypoint with respect to the existing waypoint.

10. The method of claim 9 wherein the new waypoint is a position-bearing-distance waypoint.

11. A method for positioning a new waypoint in a flight plan displayed on an avionics in the form of an interactive graphical image, the method comprising:
processing user input to select a first existing waypoint;
displaying a compass rose centered on the first selected waypoint;
dragging a first bearing line from the first existing waypoint;
processing user input to select a second existing waypoint;
displaying a compass rose centered on the second selected waypoint;
dragging a second bearing line from the second existing waypoint; and
generating symbology on the display graphically representative of the new waypoint at an intersection of the first and second bearing lines.

12. The method of claim 11 wherein the new waypoint is a PBPB waypoint.

13. A method for imposing an altitude constraint on an existing flight plan, the method comprising:
simultaneously rendering at least a portion of the existing flight plan on a lateral map display and a vertical situation display on a display;
generating symbology on the vertical situation display graphically representative of an altitude constraint line;
dragging the altitude constraint line to a desired altitude constraint level on the vertical situation display;
displaying a numerical value of the altitude constraint level while dragging the altitude constraint line to the desired altitude constraint level; and
inserting the altitude constraint into the existing flight plan.

* * * * *